United States Patent
Park et al.

(10) Patent No.: US 7,609,325 B2
(45) Date of Patent: Oct. 27, 2009

(54) APPARATUS AND METHOD FOR CALCULATING SOURCE IMAGE COORDINATES

(75) Inventors: Seok-Jun Park, Gyeonggi-do (KR); Gwang-Sun Lee, Seoul (KR); Yong-In Han, Gyeonggi-do (KR); Jung-Tae Kim, Chungcheongnam-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 766 days.

(21) Appl. No.: 11/274,987

(22) Filed: Nov. 15, 2005

(65) Prior Publication Data

US 2006/0103680 A1 May 18, 2006

(30) Foreign Application Priority Data

Nov. 15, 2004 (KR) .................. 10-2004-0092975

(51) Int. Cl.
*H04N 5/46* (2006.01)
(52) U.S. Cl. .................. 348/556; 348/445; 348/580
(58) Field of Classification Search ................ 348/445, 348/556, 557, 581, 582, 583, 561, 562, 580; 382/293–301
See application file for complete search history.

(56) References Cited

U.S. PATENT DOCUMENTS 5,067,019 A * 11/1991 Juday et al. ................ 348/580
5,818,527 A * 10/1998 Yamaguchi et al. ......... 348/335
7,158,158 B1 * 1/2007 Fleming et al. ............. 345/698
2002/0021365 A1 2/2002 Yang et al.

FOREIGN PATENT DOCUMENTS

| KR | 1999-12410 | 2/1999 |
| KR | 2003-0008840 | 1/2003 |
| WO | WO 99/30483 | 6/1999 |

OTHER PUBLICATIONS

English language abstract of Korean Publication No. 1999-12410.
English language abstract of Korean Publication No. 2003-0008840.
English language abstract of Japanese PCT Publication No. WO 99/30483.

* cited by examiner

*Primary Examiner*—M. Lee
(74) *Attorney, Agent, or Firm*—Marger Johnson & McCollom, P.C.

(57) ABSTRACT

A method and an apparatus for calculating source image coordinates. In an embodiment, a variation rate of the source image coordinate with respect to a converted image coordinate is calculated by a recursive computation, and variation rates are accumulated to obtain the source image coordinate. Because the converted image coordinate sequentially increases one-by-one, the variation rate may be obtained by using adding operations of previously obtained source image coordinate, rather than multiplying operations with the all of the converted image coordinates. Therefore, the source image coordinates may simply and effectively be calculated.

22 Claims, 6 Drawing Sheets

APPARATUS AND METHOD FOR CALCULATING SOURCE IMAGE COORDINATES

CROSS-REFERENCE TO RELATED APPLICATIONS

This application claims the benefit under 35 U.S.C. § 119 (a) of Korean Patent Application No. 2004-0092975 filed on Nov. 15, 2004, the contents of which are herein incorporated by reference in their entirety.

BACKGROUND OF THE INVENTION

1. Field of the Invention

The present invention relates to an image process apparatus and an image process method for a panorama/waterglass function. More particularly, the present invention relates to an apparatus and a method for calculating source image coordinates.

2. Description of the Related Art

Conversion between images having different resolutions needs to be performed with care. For example, when a television signal with 4:3 horizontal-to-vertical ratio is applied to a widescreen television with 16:9 horizontal-to-vertical ratio, images are displayed on only a portion of the widescreen while the images maintain the 4:3 ratio, or appropriately scaled images are displayed on the entire 16:9 widescreen. When the images maintain the 4:3 ratio, image distortion does not occur. However, when the images are displayed on the entire 16:9 widescreen, an image distortion problem arises. That is, the image is horizontally lengthened, or broadened, due to conversion of the 4:3 ratio standard television signal to the 16:9 widescreen television signal.

A panoramic function and a waterglass function are provided to solve such problems. The panoramic function, as well as the waterglass function, facilitates a fact that a significant amount of meaningful data of image signals, such as television signals, are generally distributed in the central portion of a screen.

In the panoramic function, while source images with a small horizontal-to-vertical ratio are converted into images with a wide horizontal-to-vertical ratio, the horizontal-to-vertical ratio of the image in the central portion is maintained close to the ratio of the source images, but the horizontal-to-vertical ratio of the image at both sides of the screen gradually increases as the image becomes farther from the center portion of the screen.

In the waterglass function, wile source images with a small horizontal-to-vertical ratio are converted into images with a wide horizontal-to-vertical ratio, the horizontal-to-vertical ratio of the image in the central portion is maintained close to the ratio of the source images, but the horizontal-to-vertical ratio of the image at both sides of the screen gradually decreases as the image becomes farther from the center portion of the screen.

FIGS. 1A to 1C illustrate image conversion concepts, according to a prior art, in which the small horizontal-to-vertical ratio image signals are converted into the wide horizontal-to-vertical ratio image signals. The source images to be converted in FIGS. 1A to 1C are shown as three circles aligned horizontally in FIGS. 1A to 1C.

FIG. 1A is a conceptual view that illustrates converted images displayed on a portion of the screen, when the horizontal-to-vertical ratio is maintained throughout the conversion.

Referring to FIG. 1A, the horizontal-to-vertical ratio is maintained throughout the conversion, so that the images are not displayed on portions of both sides of the screen. Thus, in maintaining the entire screen aspect ratio throughout the conversion, portions of the screen may be wasted.

FIG. 1B is another conceptual view that illustrates the source images converted in proportion to an appropriately scaled aspect ratio corresponding to an output screen.

Referring to FIG. 1B, horizontally widened images with a certain aspect ratio are displayed on the entire screen. The horizontal-to-vertical ratio is altered, so that the images are evenly spread in horizontal.

FIG. 1C is another conceptual view that illustrates an image conversion with the panoramic function.

Referring to FIG. 1C, the images are displayed on the entire screen in a way that maintains shapes of the source images in the central portion of the screen with practically no distortion, but gradually widens the shapes of the source images toward the sides of the screen. Because important portions of images are generally located in the center portion of the screen, distortions in the center portion of the screen are minimized at the cost of large distortions toward the sides of the screen.

FIG. 2 is a graph illustrating a relation between the coordinates of a source image and the coordinates of a converted image in FIG. 1A to FIG. 1C.

The graph in FIG. 2 has a horizontal axis representing a converted image coordinate n after a conversion, and a vertical axis representing an image coordinate x of the source image. A symbol xmax in the vertical axis represents a number equal to a subtraction of one from the number of horizontal pixels of the screen corresponding to the source image, i.e. (the number of horizontal pixels of the screen corresponding to the source image—1). A symbol nmax in the horizontal axis represents another number equal to a subtraction of one from the number of horizontal pixels of the converted screen corresponding to the converted image, i.e. (the number of horizontal pixels of the converted screen corresponding to the converted image—1). In the conversions of FIGS. 1A to 1C, the aspect ratios after the conversions are larger than before the conversions, so that nmax is larger than xmax.

Referring to FIG. 2, the conversion shown in FIG. 1A is represented as a straight line 210 over a portion (from n1 to n2) of the converted image coordinate axis n. The straight line has a relatively steep gradient for maintaining the aspect ratios unaltered throughout the conversion, so that the converted images are displayed on only a portion of the screen.

The conversion shown in FIG. 1B is represented as a straight line 220 with a relatively moderate gradient over the entire converted image coordinates n, for displaying the converted images on the entire screen. The straight line 220 corresponding to the conversion in FIG. 1B has a more moderate gradient than that of the straight line 210 corresponding to the conversion in FIG. 1A, so that the converted images according to the conversion in FIG. 1B are widened.

The conversion shown in FIG. 1C is represented as a curved line 230 that partly has a practically straight line with a rather steep gradient in the center portion of the screen n3 to n4, similar to the conversion in FIG. 1A, and has curved lines with gradually leveling gradients toward the sides, to display the converted images on the entire screen.

A calculation of the source image coordinates is to find a source image coordinate x corresponding to the converted image coordinate n over the graph in FIG. 2. That is, the calculation of the source image coordinates is to find a pixel of the source images from which a pixel of the converted image is converted. The value x may be a non-integer number, and in such cases, through the calculation of the source image coordinates, the pixel of the source images corresponding to an appropriate value x is generated by performing processes such as interpolation.

In the image conversions providing the panoramic function shown in FIG. 1C, the source image coordinates calculation occasionally uses polynomials. In such cases, the calculation with high order polynomials is difficult to implement in hardware, and needs complex hardware such as high-speed multipliers; thus, an implemented hardware may be very complex and expensive.

SUMMARY OF THE INVENTION

An embodiment of the present invention provides a source image coordinates calculation apparatus for simple and effective calculation of source image coordinates.

An embodiment of the present invention also provides a source image coordinates calculation method for simple and effective calculation of the source image coordinates.

According to embodiments of the present invention, there is provided a method for calculating a value of an (N−1)-th order differential polynomial corresponding to a converted image coordinate n, by a recursive computation, and calculating the source image coordinate $x_n$ corresponding to the converted image coordinate n by using the value of the (N−1)-th order differential polynomial corresponding to the converted image coordinate n and the previous source image coordinate $x_n-1$ corresponding to a previous converted image coordinate n−1. The (N−1)-th order differential polynomial is differentiated from an N-th order polynomial x(n) with respect to the converted image coordinate n, the N-th order polynomial x(n) representing the source image coordinates $x_n$ with respect to the converted image coordinate n, and N denoting a natural number larger than 2.

According to other embodiments of the present invention, there is provided an apparatus for calculating source image coordinates, the apparatus including a polynomial calculator, an accumulator and a controller. The polynomial calculator is configured to obtain a value of an (N−1)-th order differential polynomial corresponding to a converted image coordinate n, by using a recursive computation. The accumulator is configured to generate the source image coordinate xn by accumulating the value of the (N−1)-th order differential polynomial provided from the polynomial calculator. The controller is configured to control the polynomial calculator and the accumulator. The (N−1)-th order differential polynomial is differentiated from an N-th order polynomial x(n) with respect to the converted image coordinate n, the N-th order polynomial x(n) representing the source image coordinates $x_n$ with respect to the converted image coordinate n, and N denoting a natural number larger than 2.

According to other embodiments of the present invention, there is provided a method of converting a source image. The method includes calculating a first coordinate $x_n$ of the source image corresponding to a second coordinate n of a converted image by using a value of a differential polynomial corresponding to the second coordinate n and a previous first coordinate $x_{n-1}$ corresponding to a previous second coordinate n−1, wherein the differential polynomial is differentiated from a polynomial x(n) with respect to the second coordinate n, the polynomial x(n) representing the first coordinate $x_n$ with respect to the second coordinate n, and constructing the converted image by using pixel data of the source image corresponding to the calculated first coordinates $x_n$. Pixel data of the converted image corresponding to the second coordinates n may be obtained from the pixel data of the source image corresponding to the first coordinates $x_n$.

BRIEF DESCRIPTION OF THE DRAWINGS

The above and other features and advantages of the present invention will become more apparent by describing in detail exemplary embodiments thereof with reference to the accompanying drawings, in which.

DESCRIPTION OF EMBODIMENTS

Figure 1A:
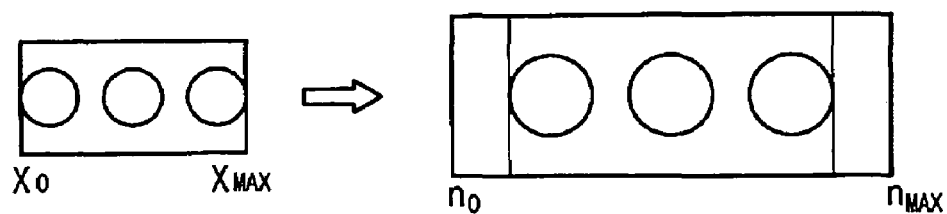
FIGS. 1A to 1C illustrate image conversion concepts according to prior art.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flow charts. For example, two blocks shown in succession may in fact be executed substantially concurrently or the blocks may sometimes be executed in the reverse order, depending upon the functionality/acts involved.

Figure 3A:
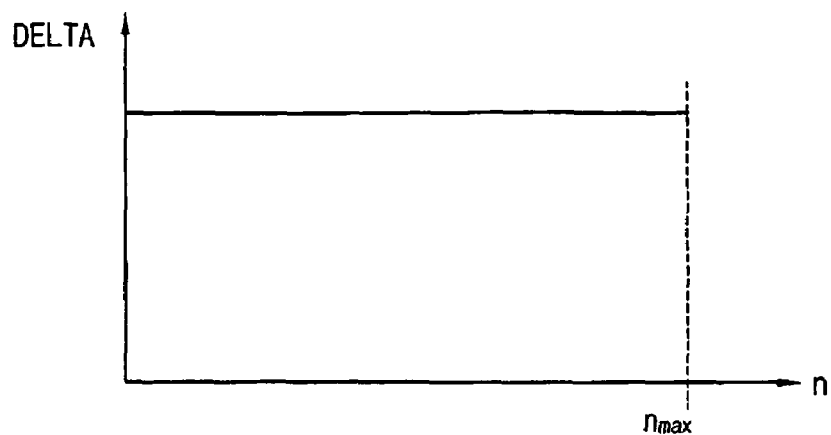
FIGS. 3A to 3C are graphs illustrating (N−1)-th order differential polynomials according to example embodiments of the present invention.
Figure 3B:
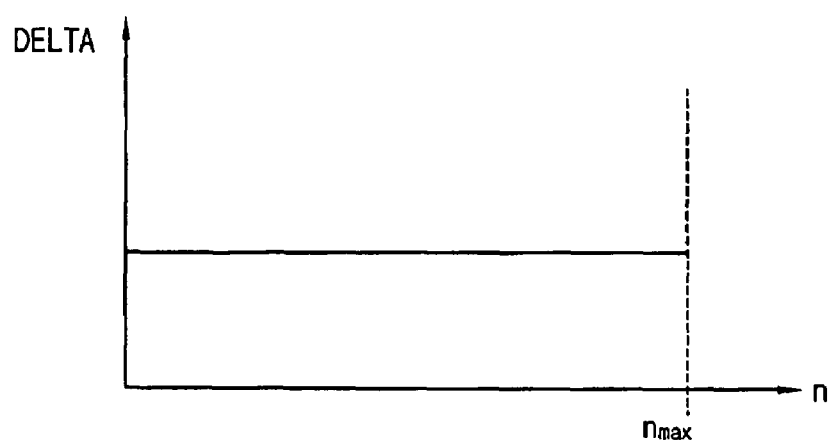
Figure 3C:
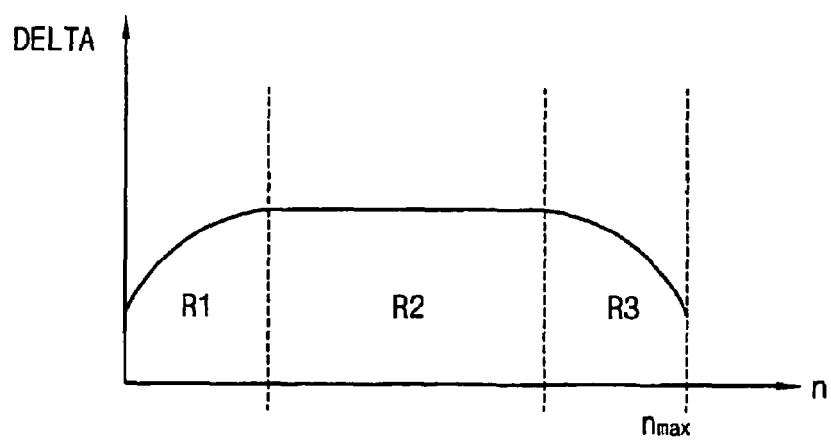

FIGS. 3A to 3C are graphs illustrating (N−1)-th order differential polynomials according to example embodiments of the present invention.

Specifically, FIG. 3A is a graph illustrating a variation rate of the source image coordinate with respect to a variation of the converted image coordinate in FIG. 1A.

Referring to FIG. 3A, the variation rate DELTA of the source image coordinate with respect to the variation of the converted image coordinate n is kept constant in such cases as FIG. 1A, where the images after the conversion are displayed on a portion of the screen while maintaining the aspect ratio throughout the conversion. A magnitude of the variation rate DELTA in FIG. 3A corresponds to a gradient of the straight line 210 in FIG. 2.

Figure 1B:
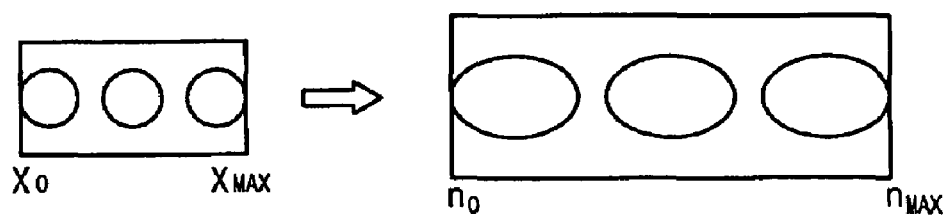

FIG. 3B is a graph illustrating a variation rate of the source image coordinate with respect to a variation of the converted image coordinate in FIG. 1B.

Referring to FIG. 3B, the variation rate DELTA of the source image coordinate with respect to the variation of the converted image coordinate n is also kept constant in such cases as FIG. 1B, where the images after the conversion are displayed on the entire screen with the horizontally stretched aspect ratio. A magnitude of the variation rate DELTA in FIG. 3B corresponds to a gradient of the straight line 220 in FIG. 2. Because the images are horizontally stretched throughout the conversion, the variation rate DELTA in FIG. 3B is smaller than the variation rate DELTA in FIG. 3A.

Figure 1C:
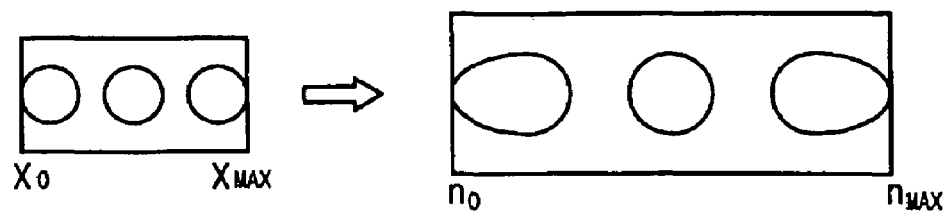

FIG. 3C is a graph illustrating variation rate of the source image coordinate with respect to a variation of the converted image coordinate in FIG. 1C.

Figure 2:
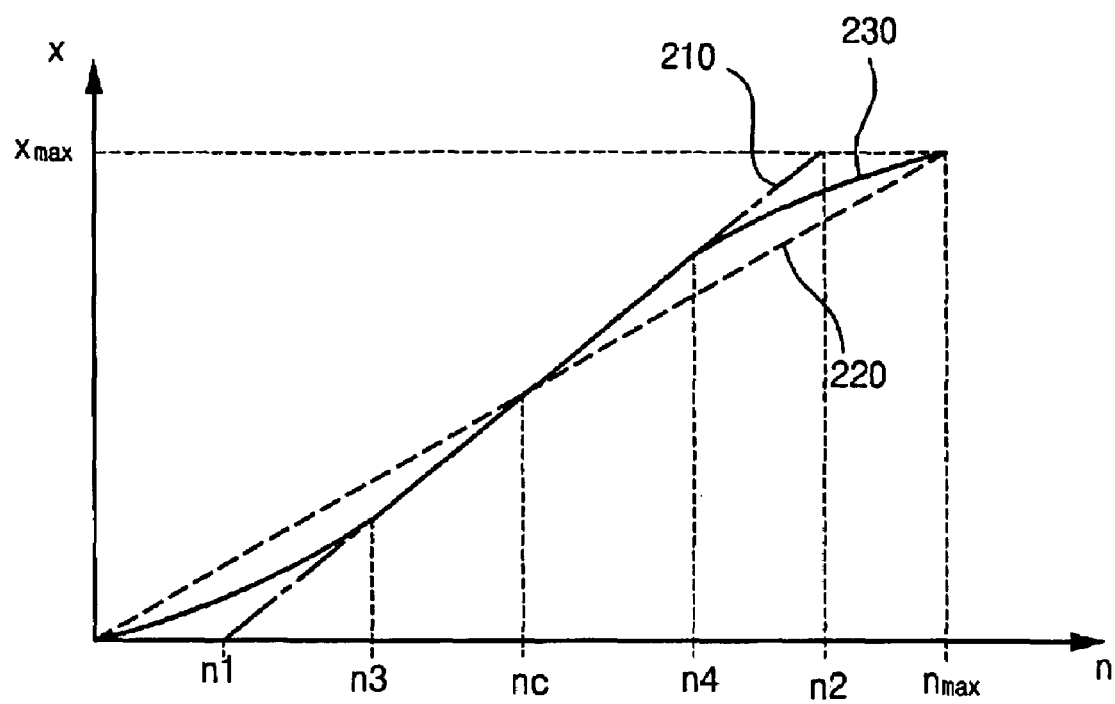
FIG. 2 is a graph illustrating a relation between the coordinates of a source image and the coordinates of the converted images in FIG. 1A to FIG. 1C.

Referring to FIG. 3C, the variation rate DELTA of the source image coordinate with respect to the variation of the converted image coordinate n varies as curved lines in regions R1 and R3, and is kept constant in the other region R2, as in the case of FIG. 1C. For example, the region R2 may occupy one half of the entire screen width and the regions R1 and R3 may respectively occupy one fourth of the entire screen width. Each curved line represented within the regions R1 and R3 in FIG. 3C is obtained by differentiating each of the curved side portions of the curved line 230 in FIG. 2 with respect to the converted image coordinate n. When the curved portions of the curved line 230 in FIG. 2 are represented as N-th order polynomials, the curved lines within the regions R1 and R3 in FIG. 3C may be represented as (N−1)-th order differential polynomials. A magnitude of the straight line within the region R2 corresponds to the gradient of the straight line 230 in FIG. 2.

In image conversions with the panoramic function, calculation of the source image coordinate x needs the (N−1)-th order differential polynomials respectively representing the curved lines in the regions R1 and R3 in FIG. 3C. The (N−1)-th order differential polynomials may be expressions with respect to the converted image coordinate n having natural numbers, thus the variation rate DELTA of the corresponding source image coordinate $x_n$ may be obtained from the (N−1)-th order differential polynomials. That is, the variation rate DELTA of the source image coordinate $x_n$ at the converted image coordinate n may be calculated from a value of the (N−1)-th polynomial, and the value can be obtained by inserting the converted image coordinate n (for example, a natural number) into the (N−1)-th order differential polynomial that is a function of n. Therefore, the present source image coordinate $x_n$ is calculated by adding the newly obtained variation rate DELTA of the source image coordinate $x_n$ and the previous source image coordinate $x_n-1$ corresponding to the previous converted image coordinate n−1.

The variation rate of the N-th order polynomial of the source image coordinate $x_n$ is substantially identical to the value of the (N−1)-th order differential polynomial which is a differentiation of the N-th order polynomial x(n) with respect to n. The variation rate DELTA of the N-th order polynomial can be represented as the value DELTA of the (N−1)-th order differential polynomial.

Figure 4:
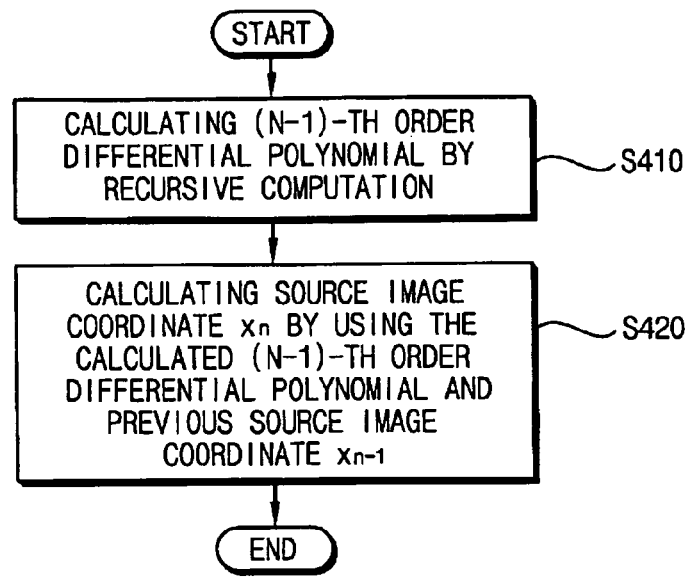
FIG. 4 is a flow chart illustrating a calculation method for source image coordinates according to example embodiments of the present invention.

FIG. 4 is a flow chart illustrating a calculation method for source image coordinates according to example embodiments of the present invention. In the embodiments of the present invention, coordinates of source images are respectively calculated from coordinates of converted images to construct the converted images.

In the panoramic conversion or the waterglass conversion, the converted images are displayed at the converted image coordinates based on a predetermined N-th order polynomial, which is a conversion relationship from the source image coordinates to the converted image coordinates.

While the prior arts calculate the converted image coordinates from the source image coordinates by interpolation and the like, the embodiments of the present invention may reversely calculate the source image coordinates from the converted image coordinates based on the (N−1)-th order differential polynomial differentiated from the predetermined N-th order polynomial. The embodiments of the present invention may bring pixel data of the source image at the calculated source image coordinates to pixel data of the converted image at the converted image coordinates in order to construct the converted image.

Referring to FIG. 4, the calculation method for the source image coordinates according to example embodiments of the present invention begins with calculating a value of the (N−1)-th order differential polynomial with a recursive computation (step S410).

The (N−1)-th order differential polynomial is a polynomial with respect to the converted image coordinate n, and a value of the (N−1)-th order differential polynomial represents the variation rate DELTA of the N-th order polynomial, which represents the source image coordinate $x_n$, with respect to the converted image coordinate n.

The recursive computation is used because the source image coordinates $x_n$ are calculated with respect to the converted image coordinate n, which is a natural number larger than zero. The source image coordinate $x_n$ is calculated by summing terms of the (N−1)-th order differential polynomial with respect to the previous conversion image coordinate (n−1), rather than by calculating the (N−1)-th order differential polynomial with respect to every converted image coordinate n.

For example, where a second order differential polynomial representing a variation rate (referred to as DELTA) with respect to a converted image coordinate n is given as $An^2+Bn+C$, another second order differential polynomial for a variation rate DELTA with respect to a previous converted image coordinate (n−1) is $A(n-1)^2+B(n-1)+C$. The polynomial $An^2+Bn+C$ may be represented as $A(n-1)^2+2A(n-1)+A+B(n-1)+B+C$. Therefore, the expression $An^2+Bn+C$ does not need calculations of $An^2$ and Bn, but instead a recursive summation of the coefficients A, B, and C, and the terms $A(n-1)^2$, $2A(n-1)$, and $B(n-1)$ that are calculated during a previous calculation.

Next, the source image coordinate $x_n$ is calculated by using a newly calculated value DELTA of the (N−1)-th order differential polynomial and the previous source image coordinate $x_{n-1}$ corresponding to the previous converted image coordinate n−1 (step S420).

Because the (N−1)-th order differential polynomial corresponds to the variation rate of the source image coordinate $x_n$, the current source image coordinate $x_n$ may be calculated by adding the value DELTA of the (N−1)-th order differential polynomial to the previous source image coordinate $x_{n-1}$ corresponding to the previous converted image coordinate n−1.

In the following, an example embodiment is illustrated in detail, taking an example of a third order polynomial x(n) where the curved lines in the regions R1 and R3 in FIG. 3C are represented as a second order differential polynomial (dx(n)/dn).

Figure 5:
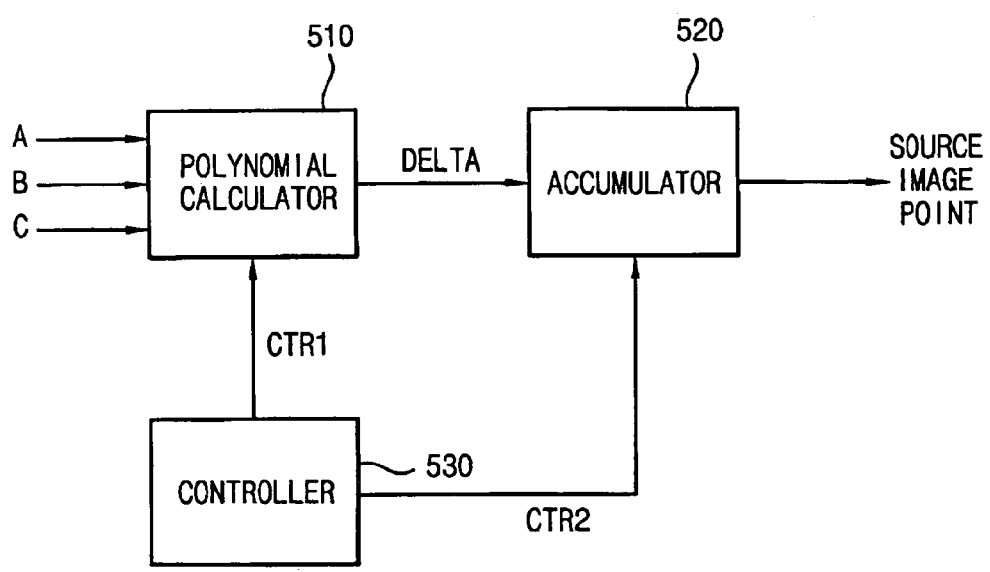
FIG. 5 is a block diagram illustrating a source image coordinates calculation apparatus according to example embodiments of the present invention.

FIG. 5 is a block diagram illustrating a source image coordinates calculation apparatus according to example embodiments of the present invention.

Referring to FIG. 5, the source image coordinates calculation apparatus includes a polynomial calculator 510, an accumulator 520 and a controller 530.

The polynomial calculator 510 obtains, by using a recursive computation, a value DELTA of a second order differential polynomial which is equal to the differentiation of the third order polynomial, representing the source image coordinate $x_n$, with respect to the converted image coordinate n. Although the example embodiment takes an example of a second order polynomial differentiated from a third order polynomial, the polynomial calculator 510 may adopt an (N−1)-th order differential polynomial differentiated from any given N-th order polynomial.

Specifically, the polynomial calculator 510 obtains the value DELTA by recursively summing coefficients and the previously obtained value DELTA, rather than by calculating the second order polynomial for every converted image coordinate n.

The accumulator 520 accumulates the values DELTA to generate and output an image coordinate. Because the value DELTA corresponds to the variation rate of the source image coordinate x, the source image coordinate x may be calculated by accumulating the values DELTA corresponding to every converted image coordinate n, after an initial value is appropriately set.

The controller 530 controls the polynomial calculator 510 and the accumulator 520. Specifically, the controller 530 may control the polynomial calculator 510 by a first control signal CTR1, and the accumulator 520 by a second control signal CTR2.

Because the polynomial calculator circuit 510 sums the previous value DELTA and polynomial coefficients to calculate the present value DELTA, the polynomial calculator circuit 510 needs to be appropriately initialized. The accumulator 520 also needs to be appropriately initialized because the accumulator 520 accumulates the value DELTA to generate the source image coordinate $x_n$. The controller 530 controls the polynomial calculator 510 and the accumulator 520 to be appropriately initialized.

The controller 530 controls the polynomial calculator 510 to operate corresponding to the converted image coordinate n. For example, in the regions R1 and R3 in FIG. 3C, the controller 530 controls the polynomial calculator 510 to calculate the value DELTA with a recursive computation. In the region R2 in FIG. 3C, the controller 530 controls the polynomial calculator 510 to maintain a constant value for DELTA. In such cases, calculations of the values DELTA in the regions R1 and R3 in FIG. 3C may be symmetric.

Figure 6:
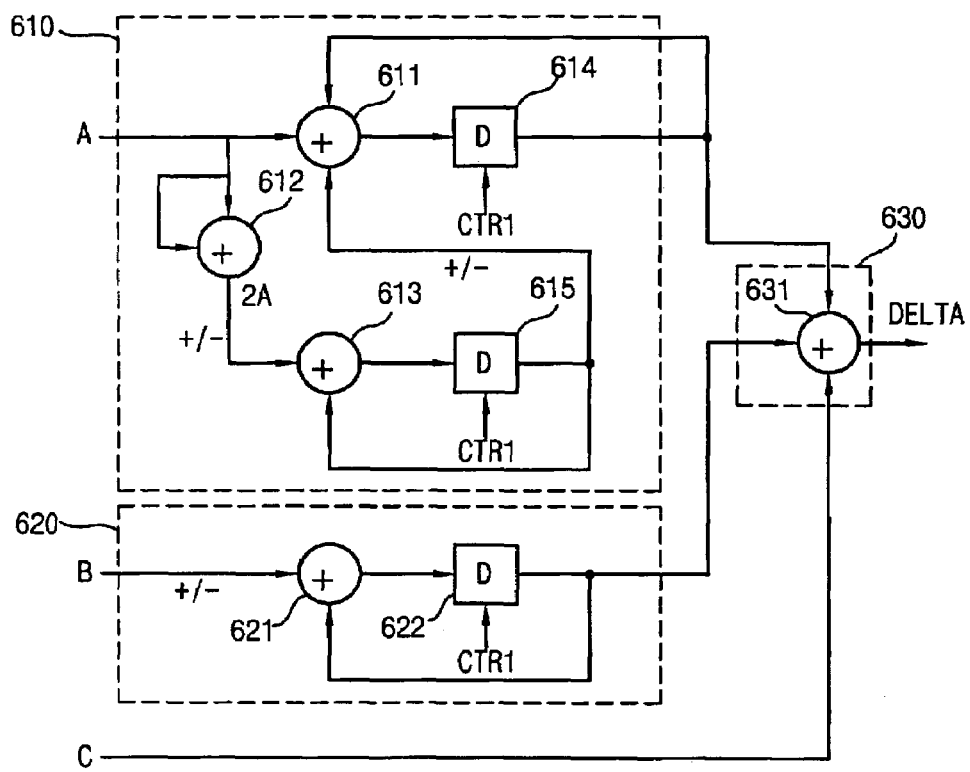
FIG. 6 is a block diagram illustrating a polynomial calculator in FIG. 5.

FIG. 6 is a block diagram illustrating the polynomial calculator in FIG. 5.

Referring to FIG. 6, the polynomial calculator 510 includes a second order term calculator 610, a first order term calculator 620 and a summing part 630.

The second order term calculator 610 calculates a second order term of a second order differential polynomial value DELTA by using the following expression 1 and expression 2.

$$An^2 = A(n-1)^2 + 2A(n-1) + A \qquad \text{<Expression 1>}$$

$$2An = 2A(n-1) + 2A \qquad \text{<Expression 2>}$$

wherein n denotes a present converted image coordinate, n−1 denotes a previous converted image coordinate, and A denotes a second order coefficient of the second order differential polynomial DELTA.

The second order term calculator 610 includes adders 611, 612 and 613 and flip-flops 614 and 615. The adder 611 adds the second order coefficient A and outputs of the flip-flops 614 and 615 to output the added result. The adder 612 adds two of the second order coefficient A to output a doubled coefficient (2A). The adder 613 adds the outputs of the adder 612 and the flip-flop 615 to output the added result.

The flip-flops 614 and 615 respectively latch the outputs of the adders 611 and 613. The flip-flops 614 and 615 may output the received data based on the first control signal CTR1 activated when the converted image coordinate is altered. The flip-flops 614 and 615 are initialized with proper numbers by the first control signal CTR1 at an initial stage of the second order term calculator 610. For example, the flip-flops 614 and 615 may be initialized with 0.

The second order term calculator 610 operates differently according to which regions the converted image coordinates n are located in.

When the converted image coordinate n is located in the region R1 in FIG. 3C, the second order term calculator 610 calculates the second order term by using the expressions 1 and 2, in a way described in detail as follows.

To calculate the second order term of the converted image coordinate n, the flip-flop 614 has the second order term $A(n-1)^2$ of the polynomial value DELTA corresponding to the previous converted image coordinate n−1. At the same time, the flip-flop 615 has a value of $2A(n-1)$. The second order term $An^2$ corresponding to the converted image coordinate n may be obtained by adding the second order coefficient A to the outputs of the flip-flops 614 and 615, as in expression 1.

The obtained second order term $An^2$ of the second order differential polynomial value DELTA corresponding to the converted image coordinate n is stored in the flip-flop 614. At the same time, an output from a calculation in expression 2 by the adder 613 is stored in the flip-flop 615.

The second order term calculator 610 repeats the operations described above to obtain the second order terms of the second order differential polynomial value DELTA based on the first control signal CTR1 activated whenever the converted image coordinate n changes.

When the converted image coordinate n is located in the region R2 in FIG. 3C, the second order term calculator 610 keeps the second order terms unaltered, rather than calculating the value DELTA. Thus, the flip-flops 614 and 615 keep the outputs constant, in spite of the variation of the converted image coordinates n.

When the converted image coordinate n is located in the region R3 in FIG. 3C, the second order term calculator 610 performs operations symmetrical to those in which the converted image coordinate n is located in the region R1 in FIG. 3C.

The second order term calculator 610 changes the sign of the output of the adder 612 to provide the sign-changed output of the adder 612 to the adder 613, and changes the sign of the output of the flip-flop 615 to provide the sign-changed output of the flip-flop 615 to the adder 611. The second order term calculator 610 calculates the second order terms in a similar computation to cases in which the converted image coordinate n is located in the region R1 in FIG. 3C, because the second order differential polynomials in regions R1 and R3 in FIG. 3C are symmetric of each other (referring to FIG. 3C). The calculation methods for the second order terms with respect to the regions may be selected by using an 'if', syntax of HDL (Hardware Described Language) code, or may be selected by using multiplexers.

The first order term calculator 620 calculates a first order term of a second order differential polynomial value DELTA by using the following expression 3.

$$Bn = B(n-1) + B \qquad \text{<Expression 3>}$$

wherein n denotes a present converted image coordinate, n−1 denotes a previous converted image coordinate and B denotes a first order coefficient of the second order polynomial.

The first order term calculator 620 includes an adder 621 and a flip-flop 622. The adder 621 adds the first order coefficient B and an output of the flip-flop 622 to output the added output. The flip-flop 622 stores the output of the adder 621. The flip-flop 622 may output the stored data based on the first control signal CTR1 activated when the converted image coordinate n changes. The flip-flop 622 is properly initialized by the first control signal CTR1 at an initial stage of the first order term calculator 620. For example, the flip-flop 622 may be initialized with 0.

The second order term calculator 610 operates differently corresponding to which regions the conversion image coordinate n is located.

When the converted image coordinate n is located in the region R1 in FIG. 3C, the first order term calculator 620 calculates the first order term by using expression 3 in a way described in detail as follows.

To calculate the first order term of the second order differential polynomial value DELTA corresponding to the converted image coordinate n, the flip-flop 622 has the first order term corresponding to the previous converted image coordinate n−1 that is, B(n−1). The first order term Bn corresponding to the conversion image coordinate n may be obtained by adding the first order coefficient B to the output of the flip-flop 622, and then is stored in the flip-flop 622. The first order term calculator 620 repeats the processes described as above to obtain the first order terms of the second order differential polynomial value DELTA based on the first control signal CTR1 activated whenever the converted image coordinate n changes.

When the converted image coordinate n is located in the region R2 in FIG. 3C, the first order term calculator 620 keeps the first order terms unaltered, rather than calculate the first order terms. Thus, the flip-flop 622 keeps the output constant, in spite of the variation of the converted image coordinate n.

When the converted image coordinate n is located in the region R3 in FIG. 3C, the first order term calculator 620 performs processes symmetrical to those in which the conversion image coordinate n is located in the region R1 in FIG. 3C.

The first order term calculator 620 changes the sign of the first order coefficient to provide the sign-changed first order coefficient to the adder 621. The first order term calculator 620 calculates the first order terms in a similar computation to cases in which the conversion image coordinate n is located in the region R1 in FIG. 3C, because the second order differential polynomials in regions R1 and R3 in FIG. 3C are symmetric to each other.

The summing part 630 generates the second order polynomial value DELTA by summing the second order term $An^2$, the first order term Bn, and a constant C. The second order term $An^2$ and the first order term Bn are calculated with respect to a given converted image coordinate n.

Therefore, the polynomial calculator in FIG. 6 may calculate the present second order differential polynomial value DELTA only by adding operations using already obtained results in the previous second order differential polynomial value DELTA, rather than by multiplying operations for every converted image coordinate that successively increases one-by-one.

Figure 7:
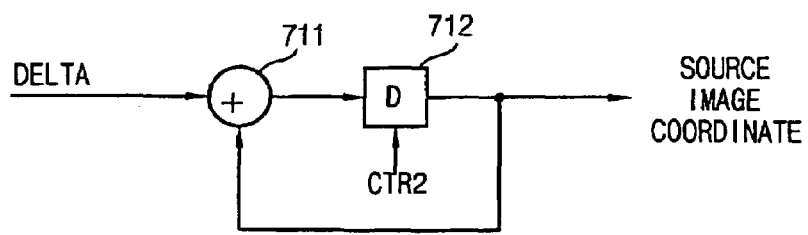
FIG. 7 is a block diagram illustrating an accumulator in FIG. 5.

FIG. 7 is a block diagram illustrating the accumulator in FIG. 5. Referring to FIG. 7, the accumulator 520 includes an adder 711 and a flip-flop 712.

The adder 711 adds the second order differential polynomial value DELTA and an output (previous source image coordinate $x_{n-1}$) of the flip-flop 712 to output the present source image coordinate $x_n$.

The flip-flop 712 stores the output of the adder 711. The flip-flop 712 may output the stored source image coordinate $x_n$ based on the second control signal CTR2 activated when the converted image coordinate n is altered. The flip-flop 712 is initialized with a proper value by the second control signal CTR2 at the initial stages of the accumulator 520. For example, the flip-flop 712 may be initialized with 0. The flip-flop 712 repeatedly stores the source image coordinate equal to an addition of the second order differential polynomial value DELTA and the previously stored source image coordinate in the flip-flop 712, so that the flip flop 712 accumulates the second order differential polynomial values DELTA and outputs the source image coordinates in FIG. 7.

Figure 8:
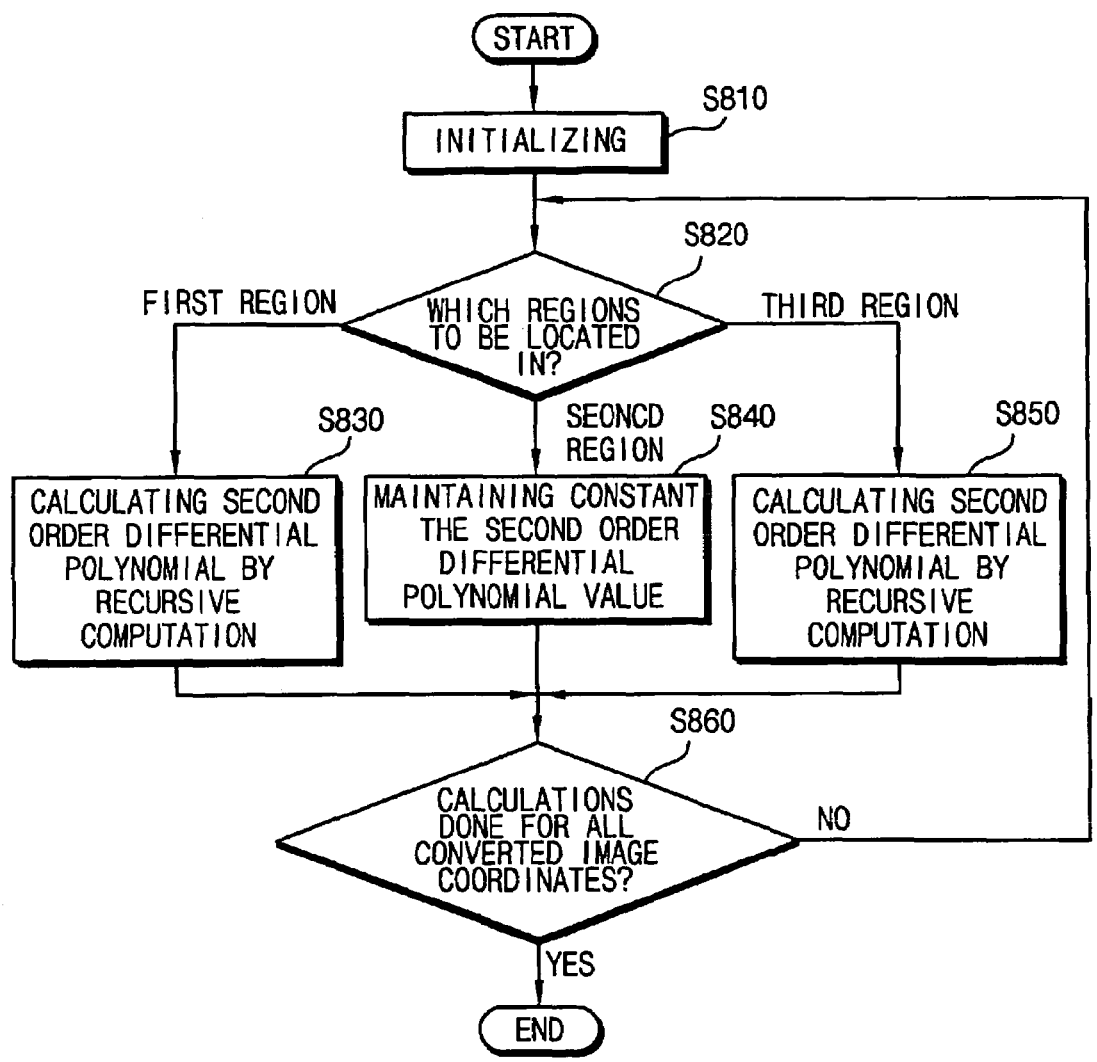
FIG. 8 is a flow chart illustrating operation of a controller in FIG. 5.

FIG. 8 is a flow chart illustrating operation of the controller in FIG. 5.

Referring to FIG. 8, the controller 530 generates the first and second control signals CTR1 and CTR2 to appropriately initialize the flip-flops in the polynomial calculator 510 and the accumulator 520 (step S810). The first and second control signals CTR1 and CTR2 may be identical to each other, or independent to each other. For example, the first and second control signals CTR1 and CTR2 initialize all of the flip-flops in the polynomial calculator 510 and the accumulator 520 with zeros.

Next, the controller 530 determines in which regions the converted image coordinate n is located (step S820). For example, the controller 530 determines in which region, among the three regions R1, R2 and R3 in FIG. 3C, the converted image coordinate n is located.

When the converted image coordinate n is located in the region R1 in FIG. 3C, the controller 530 controls the flip-flops in the polynomial calculator 510 and the accumulator 520 to output a stored source image coordinate when the converted image coordinate changes (step S830).

When the converted image coordinate n is located in the region R2 in FIG. 3C, the controller 530 controls the flip-flops in the accumulator 520 to output a stored source image coordinate at the time when the converted image coordinate changes, and controls the flip-flops in the polynomial calculator 510 to maintain the second order differential polynomial value DELTA constant (step S840).

When the converted image coordinate n is located in the region R3 in FIG. 3C, the controller 530 controls the flip-flops in the accumulator 520 to output a stored source image coordinate x at the time when the converted image coordinate n changes, and controls the flip-flops in the polynomial calculator 510 to operate in a similar way as step S830. Specifically, the polynomial calculator 510 changes the sign of the output of the adder 612 to provide the sign-changed output of the adder 612 to the adder 613, changes the sign of the output of the flip-flop 615 to provide the sign-changed output of the flip-flop 615 to the adder 611, and changes the sign of the first order coefficient B to then provide the sign-changed first order coefficient B to the adder 621 (step S850).

Next, the controller 530 determines whether the source image coordinates are calculated with respect to all of the converted image coordinates (step S860). When other source image coordinates to be calculated still remain, the controller returns to the step S820 and determines which regions the next coordinate belongs to. When all of the source image coordinates are calculated, the controller finishes the operations.

The above-described source image coordinates calculation method and the source image coordinates calculation apparatus focus on the panoramic function, however the example embodiments described above may be directly applied to the waterglass function. For example, when the regions R1 and R3 in FIG. 3C have convex lines curved downwardly to operate a waterglass conversion, the waterglass conversion may obviously be performed by using similar recursive computations described above.

To calculate the source image coordinate precisely, coefficients of the second order differential polynomial themselves need to be precise. For example, when a converted screen has a width of 2048 pixels, a tolerant error after accumulating the second order differential polynomial value 1024 times is beyond the 6th bit to the right of a decimal point, that is $\frac{1}{64}$ ($\frac{1}{2^6}$), in order that the source image coordinates have errors beyond the sixth bit to the right of a decimal point. Therefore, the second order differential polynomial value needs to be calculated with a precision of 17 bits to the right of a decimal point. For the second order differential polynomial value with a precision of 17 bits to the right of a decimal point, the second order term, the first order term and constant term in the second order differential polynomial value respectively need to be calculated to 19 bits to the right of a decimal point.

When the converted screen has 2048 pixels, the converted image coordinates are presented as 11-bit words and the squares of the converted image coordinates as 22-bit words. Thus, 41 bits, that is, 19+22 bits, need to be assigned for a calculation of the second order terms of the second order differential polynomial value, to calculate with a precision of 19 bits to the right of a decimal point. Similarly, 30 bits, or 19+11 bits, need to be assigned for calculation of the first order terms, and 19 bits need to be assigned for calculation of the constant terms. Then, errors of the source image coordinates can be kept beyond the 6th bit to the right of a decimal point.

The coefficients of the second order term, the first order term and the constant term of the second order differential polynomial are determined from characteristics of the lines in FIG. 3C.

For example, the second order differential polynomial satisfies a condition that the sum of the second order differential polynomial values DELTA of all converted image coordinates in the region R1 in FIG. 3C is half as much as the sum of the second order differential polynomial values DELTA of all converted image coordinates in the entire source screen except a portion of the source screen corresponding to the region R2. Additionally, on a boundary between the regions R1 and R2 in FIG. 3C, the second order differential polynomial values DELTA are identical to each other. With such conditions, the source image coordinates may be obtained within the tolerant error range.

The foregoing is illustrative of the present invention and is not to be construed as limiting thereof. Although a few example embodiments of the present invention have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

For example, the source image coordinates may be presented with second order differential polynomials or higher order polynomials other than the third order polynomials. In such cases, the polynomial calculator calculates polynomials of which order is higher than a first order. As far as recursive computations are used in calculation and accumulation of the variation rate to obtain the source image coordinates at conversion with the panoramic function as well as the waterglass function, such modifications should be construed to be included within the scope of the following claims.

As described above, the method of calculation of source image coordinate and the apparatus of calculation of source image coordinate, according to the example embodiments of the present invention, does not use multiplying operations, but use recursive adding operations using results from the previously calculated polynomial to calculate the polynomial value. Therefore, the apparatus of calculation of the source image coordinate may be easily implemented and the cost may be reduced. Further, the size of chip implemented on and the power consumption may also decrease and the operation speed may increase.

What is claimed is:

1. A method of calculating source image coordinates comprising:
   calculating, by a polynomial calculator, a value of an (N−1)-th order differential polynomial corresponding to a converted image coordinate n, by a recursive computation; and
   calculating, by an accumulator, the source image coordinate $x_n$ corresponding to the converted image coordinate n by using the value of the (N−1)-th order differential polynomial corresponding to the converted image coordinate n and the previous source image coordinate $x_{n-1}$ corresponding to a previous converted image coordinate n−1,
   wherein the (N−1)-th order differential polynomial is differentiated from an N-th order polynomial x(n) with respect to the converted image coordinate n, the N-th order polynomial x(n) representing the source image coordinates $x_n$ with respect to the converted image coordinate n, and N denoting a natural number larger than 2, and wherein a second order differential polynomial is the same as the (N−1)-th order differential polynomial when N=3.

2. The method of claim 1, wherein N is equal to 3.

3. The method of claim 1, wherein the method is used for a screen conversion with a panoramic function.

4. The method of claim 1, wherein the calculating the value, by the polynomial calculator, of an (N−1)-th order differential polynomial by the recursive computation uses the following expressions 1 and 2 recursively to obtain a second order term of the (N−1)-th order differential polynomial, $$An^2 = A(n-1)^2 + 2A(n-1) = A \qquad \text{<Expression 1>}$$

$$2An = 2A(n-1) + 2A \qquad \text{<Expression 2>}$$

wherein A denotes a second order coefficient of the second order differential polynomial.

5. The method of claim 4, wherein calculating, by the polynomial calculator, the value of the (N−1)-th order differential polynomial uses the following expression 3 recursively to obtain a first order term of the second order differential polynomial, $$Bn = B(n-1) + B, \qquad \text{<Expression 3>}$$

wherein B is a first order coefficient of the second order differential polynomial.

6. The method of claim 1, wherein calculating, by the polynomial calculator, the value of then (N−1)-th order differential polynomial comprises:
   maintaining constant the value of the second order differential polynomial, when the converted image coordinates n are located in a central portion of a converted image; and
   calculating the value of the second order differential polynomial by the recursive computation, when the converted image coordinates n are located at sides of the converted image.

7. The method of claim 1, wherein calculating the source image coordinate $x_n$ comprises adding the value of the second order differential polynomial corresponding to the converted image coordinate n and the previous source image coordinate $x_{n-1}$ corresponding to the previous converted image coordinate n−1.

8. The method of claim 1, wherein the method is used for a screen conversion with a waterglass function.

9. An apparatus for calculating source image coordinates, the apparatus comprising:
   a polynomial calculator configured to obtain a value of an (N−1)-th order differential polynomial corresponding to a converted image coordinate n, by a recursive computation;
   an accumulator configured to generate the source image coordinate $x_n$ by accumulating the value of the (N−1)-th order differential polynomial provided from the polynomial calculator; and
   a controller configured to control the polynomial calculator and the accumulator,
   wherein the (N−1)-th order differential polynomial is differentiated from an N-th order polynomial x(n) with respect to the converted image coordinate n, the N-th order polynomial x(n) representing the source image coordinates $x_n$ with respect to the converted image coordinate n, and N denoting a natural number larger than 2, and wherein a second order differential polynomial is the same as the (N−1)-th order differential polynomial when N=3.

10. The apparatus of claim 9, wherein N is equal to 3.

11. The apparatus of claim 9, wherein the apparatus is used for a screen conversion with a panoramic function.

12. The apparatus of claim 9, wherein the polynomial calculator uses the following expressions 1 and 2 recursively to obtain a second order term of the (N−1)-th order differential polynomial, $$An^2 = A(n-1)^2 + 2A(n-1) + A \qquad \text{<Expression 1>}$$

$$2An = 2A(n-1) + 2A, \qquad \text{<Expression 2>}$$

wherein A denotes a second order coefficient of the second order differential polynomial.

13. The apparatus of claim 12, wherein the polynomial calculator uses the following expression 3 recursively to obtain a first order term of the second order differential polynomial, $$Bn = B(n-1) + B, \qquad \text{<Expression 3>}$$

wherein B is a first order coefficient of the second order differential polynomial.

14. The apparatus of claim 9, wherein the accumulator outputs the source image coordinate $x_n$ by adding the value of the second order differential polynomial corresponding to the converted image coordinate n and the previous source image coordinate $x_{n-1}$ corresponding to the previous converted image coordinate n−1.

15. The apparatus of claim 9, wherein the controller initializes the polynomial calculator and the accumulator with a given initial value, and the controller generates first and second control signals to respectively control the polynomial calculator and the accumulator so that the polynomial calculator and the accumulator respectively operate based on the converted image coordinate n.

16. The apparatus of claim 9, wherein when the converted image coordinates n are located in a central portion of the converted screen, the polynomial calculator maintains constant the value of the second order differential polynomial, and when the converted image coordinates are located at sides of the converted screen, the polynomial calculator calculates the value of the second order differential polynomial by the recursive computation.

17. The apparatus of claim 9, wherein the polynomial calculator comprises:
   a second order term calculator configured to obtain a second order term $An^2$ of the second order differential polynomial;

a first order term calculator configured to obtain a first order term Bn of the second order differential polynomial; and a summing part for summing the second order term, the first order term, and a constant term C of the second order differential polynomial.

18. The apparatus of claim 17, wherein the second order term calculator comprises:

a first flip-flop configured to store the second order term $An^2$ corresponding to the converted image coordinate n, and to output the second order term $An^2$ based on a first control signal;

a second flip-flop configured to store a data 2A(n−1) corresponding to the converted image coordinate n, and to output the data 2A(n−1), based on the first control signal;

a first adder for adding an output $A(n-1)^2$ of the first flip-flop and the data 2A(n−1) of the second flip-flop and a second order coefficient A of the second order differential polynomial to output An=A(n−1)+2A(n−1)+A of the first adder to the first flip-flop;

a second adder for adding the second order coefficient A to the second order coefficient A; and a third adder for adding an output 2A of the second adder and the output 2A(n−2) of the second flip-flop corresponding to the previous converted image coordinate n−1 to output an output 2A(n−1) of the third adder to the second flip-flop.

19. The apparatus of claim 18, wherein the first order term calculator comprises:

a third flip-flop configured to store a first order term Bn and to output the first order term Bn of the second order differential polynomial, based on the first control signal; and a fourth adder for adding an output B(n−1) of the third flip-flop corresponding to the previous converted image coordinate n−1 and a first coefficient B of the second order differential polynomial to output Bn of the fourth adder to the third flip-flop, based on the first control signal.

20. The apparatus of claim 19, wherein the summing part comprises a fifth adder for adding the second order term $An^2$, the first order term Bn, and the constant term C.

21. The apparatus of claim 20, wherein the accumulator comprises:

a fourth flip-flop for storing the source image coordinate $x_n$; and a sixth adder for adding an output $x_{n-1}$ of the fourth flip-flop corresponding to the previous converted image coordinate n−1 and the output An2+Bn+C of polynomial calculator to output the source image coordinate $x_n$ of the sixth adder to the fourth flip-flop.

22. The apparatus of claim 9, wherein the apparatus is used for a screen conversion with a waterglass function.

* * * * *

UNITED STATES PATENT AND TRADEMARK OFFICE
CERTIFICATE OF CORRECTION

PATENT NO.        : 7,609,325 B2
APPLICATION NO.   : 11/274987
DATED             : October 27, 2009
INVENTOR(S)       : Seok-Jun Park et al.

It is certified that error appears in the above-identified patent and that said Letters Patent is hereby corrected as shown below:

Column 15, line 20, the equation "An=A(n-l)+2A(n-l)+A" should read -- $An^2=A(n-l)^2+2A(n-l)+A$ --.

Signed and Sealed this

Twenty-third Day of February, 2010

David J. Kappos
*Director of the United States Patent and Trademark Office*